Figure 1:
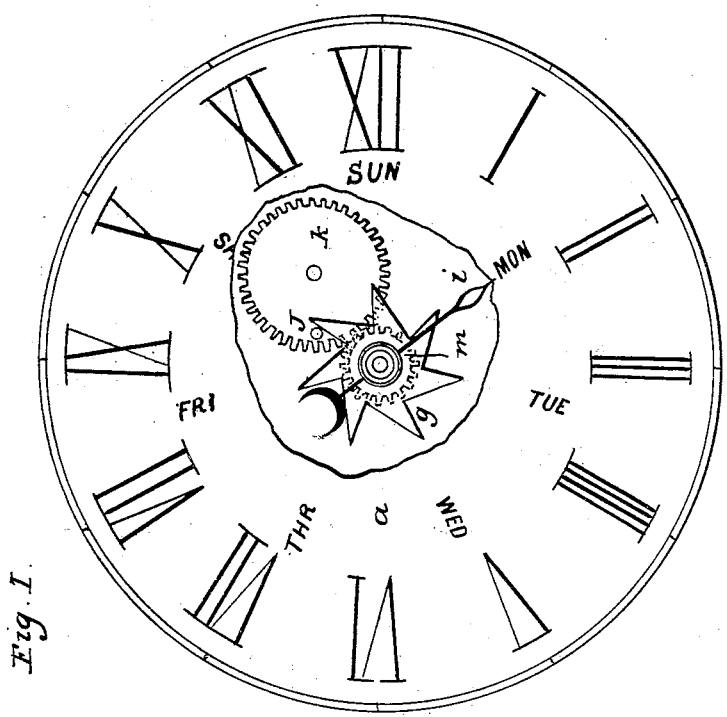
Figure 2:
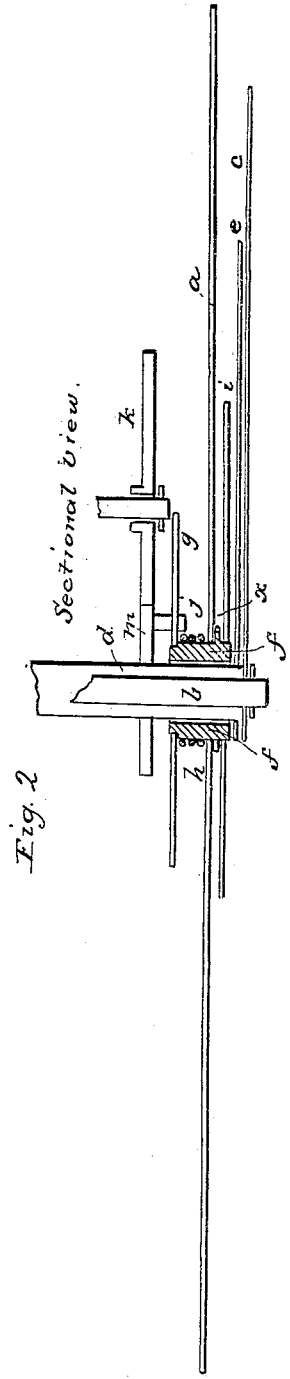

B. B. LEWIS.
Calendar Clock.

No. 43,214.

Patented June 21, 1864.

Sectional view.

Witnesses:
Cyril R. Edwards
Eugene W. Griswold

Inventor:
B. B. Lewis

UNITED STATES PATENT OFFICE.

B. B. LEWIS, OF HARTFORD, CONNECTICUT.

IMPROVEMENT IN CALENDAR-CLOCKS.

Specification forming part of Letters Patent No. 43,214, dated June 21, 1864; antedated June 15, 1864.

*To all whom it may concern:*

Be it known that I, B. B. LEWIS, of Bristol, county of Hartford, and State of Connecticut, have invented certain new and useful Improvements in Calendars for or Clocks; and I do hereby declare that the same is described and represented in the following specification and drawing; and to enabl eothers skilled in the art to make and use said improvement, I will proceed to describe its construction and operation, referring to the drawing, in which the same letters indicate like parts in each of the figures.

The nature of this improvement in calendar for clocks will be understood from the accompanying drawing and description, in which— a is a dial or face of a clock, (the face of the dial being broken out to show the device entire,) having letters and figures depicted thereon, the former to indicate the day of the week and the latter to indicate the hour of the day, by means of pointers hereinafter described.

The gears m and k are shown on model secured to the dial by means of a bridge, which is not shown in the drawing, because I do not propose always to secure said gears to the dial and therefore the bridge would not be necessary. The gears are also shown on both views, as indicated by letters m and k.

b is the center spindle, on which is placed the minute hand or pointer c.

d is a socket spindle, (operating over the center spindle b,) on which is placed the hour hand or pointer e, both of which are arranged in the usual way of arranging the hour and minute pointers on clocks.

f is a collar tube or socket. This tube or socket is made straight on the inside and of a diameter sufficiently large to allow the socket-spindle d to turn freely therein. The collar x is formed just back from the end of the tube to receive the pointer i, which is secured thereon by slightly setting or swelling the end of the tube with a cone or taper punch. Said collar x is made of a proper thickness and diameter to hold the pointer clear from the face of the dial a, and also to form a bearing to work against the face of the dial, and to keep it true therewith the diameter of this tube is fitted into the center hole of the dial a, closely yet loosely, and projects back sufficiently to receive the seven-point or star wheel g and allow of spiral spring h, or its equivalent, to be placed onto the said tube f, or between the dial a and the star-wheel g. The object of this spring is to produce tension or friction to hold it (the tube f and its appendage) in a fixed position, except when acted upon by the twenty-four-hour wheel k or its pin j.

m is a gear secured to the socket-spindle d, (of any common clock-work.)

k is a gear which turns upon a stud secured at a proper distance from the gear m to allow it to mesh and work freely with the gear m, and having such a number of teeth as to produce but one revolution thereof (of the wheel k) to two revolutions of the wheel m.

j is an actuating-pin secured in the wheel k, so that by every other or by every two revolutions of the wheel m it will produce by its action on the star-wheel g one-seventh of a revolution of the tube f, thus causing the pointer i to indicate on the face of the dial that twenty-four hours or one day has passed since its last movement, and also indicating by a pointer on the face of a dial the name of each day of the week.

It will be observed that I have here shown the pointer i, collar-tube f, star-wheel g as attached or secured to the dial a, and that it is amply suggestive to enable any person skilled in the art to make or to secure a full calendar device (to indicate by pointers on the face of a dial) to a dial; (and I would here remark that it is what I have for a long time contemplated doing.)

I have thus endeavored to show the nature, construction, and advantage of my improvement to enable a person skilled to make the same.

What I claim, therefore, and desire to secure by Letters Patent, is—

1. Securing a calendar device to a dial of such a nature as to indicate by a pointer on the face thereof a given point of time, substantially as shown and described.

2. The collar-tube f, or its equivalent, combined with the dial a, pointer i, star-wheel g, substantially as and for the purpose described.

3. A tube, $f$, having a collar, $x$, as described, in combination with a dial, $a$, for the purpose set forth.

4. The employment of a seven-tooth or star wheel, $g$, arranged upon or over the center spindle, $b\ d$, in combination with the pointer $i$, substantially as and for the purpose described.

5. The employment of a twenty-four hour wheel, $k$, to produce a successive movement of the seven tooth or star wheel $g$ once in every twenty-four hours, substantially in the manner and for the purpose described.

B. B. LEWIS.

Witnesses:
   CYRUS R. EDWARDS,
   EUGENE W. GRISWOLD.